(12) United States Patent
Baba et al.

(10) Patent No.: US 11,949,097 B2
(45) Date of Patent: Apr. 2, 2024

(54) NONAQUEOUS ELECTROLYTE SECONDARY BATTERY

(71) Applicant: Panasonic Intellectual Property Management Co., Ltd., Osaka (JP)

(72) Inventors: Yasunori Baba, Hyogo (JP); Masanori Sugimori, Osaka (JP); Katsunori Yanagida, Hyogo (JP); Nobuhiro Hirano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 404 days.

(21) Appl. No.: 17/271,348

(22) PCT Filed: Feb. 25, 2019

(86) PCT No.: PCT/JP2019/007045
§ 371 (c)(1),
(2) Date: Feb. 25, 2021

(87) PCT Pub. No.: WO2020/044612
PCT Pub. Date: Mar. 5, 2020

(65) Prior Publication Data
US 2021/0249649 A1    Aug. 12, 2021

(30) Foreign Application Priority Data
Aug. 29, 2018 (JP) .................................. 2018-160615

(51) Int. Cl.
*H01M 4/36* (2006.01)
*H01M 4/62* (2006.01)
(Continued)

(52) U.S. Cl.
CPC ........... *H01M 4/364* (2013.01); *H01M 4/621* (2013.01); *H01M 4/624* (2013.01); *H01M 4/762* (2013.01);
(Continued)

(58) Field of Classification Search
CPC .................................................... H01M 50/449
See application file for complete search history.

(56) References Cited

U.S. PATENT DOCUMENTS

| 2004/0053122 A1 | 3/2004 | Sugiyama et al. |
| 2014/0356695 A1 | 12/2014 | Abe et al. |
| 2019/0341605 A1 | 11/2019 | Tanaka et al. |

FOREIGN PATENT DOCUMENTS

| CA | 2632364 A1 * | 6/2007 | .......... H01M 10/052 |
| JP | 4109522 B2 | 7/2008 | |

(Continued)

OTHER PUBLICATIONS

International Search report dated May 7, 2019, issued in counterpart Application No. PCT/JP2019/007045. (2 pages).

*Primary Examiner* — Stephan J Essex
(74) *Attorney, Agent, or Firm* — WHDA, LLP (57) ABSTRACT

In a nonaqueous electrolyte secondary battery a separator includes a porous substrate, a first filler layer, and a second filler layer. The first filler layer comprises phosphate particles having a BET specific surface area of 5 to 100 m²/g and polyvinylidene fluoride and is formed on a first surface that faces the positive electrode side of the substrate and contacts the positive electrode. The second filler comprises inorganic particles which have a melting point higher than that of the phosphate particles and is formed on at least one of a second surface that faces the negative electrode side of the substrate and the area between the substrate and the first filler layer. The content of the polyvinylidene fluoride in the (Continued)

first filler layer is 10 to 50 mass % and is higher in a region on the positive electrode side than in a region on the substrate side.

8 Claims, 2 Drawing Sheets

(51) Int. Cl.
  *H01M 4/76* (2006.01)
  *H01M 50/431* (2021.01)
  *H01M 50/443* (2021.01)
(52) U.S. Cl.
  CPC ....... *H01M 50/431* (2021.01); *H01M 50/443* (2021.01)

(56) References Cited

FOREIGN PATENT DOCUMENTS

| | | | |
|---|---|---|---|
| JP | 2014-7089 A | 1/2014 | |
| JP | 2015-88430 A | 5/2015 | |
| JP | 2016-072120 A | 5/2016 | |
| JP | 2016-181324 A | 10/2016 | |
| JP | 2017-063041 A | 3/2017 | |
| KR | 2012024939 A * | 3/2012 | ........ H01M 10/0525 |
| WO | 2018/110188 A1 | 6/2018 | |
| WO | WO-2018101474 A1 * | 6/2018 | ............ B01J 20/041 |
| WO | 2018/139493 A1 | 8/2018 | |

* cited by examiner

NONAQUEOUS ELECTROLYTE SECONDARY BATTERY

TECHNICAL FIELD

The present disclosure relates to a non-aqueous electrolyte secondary battery.

BACKGROUND ART

A non-aqueous electrolyte secondary battery such as a lithium ion battery may abnormally generate heat due to overcharging, an internal short circuit, an external short circuit, excessive resistance heating caused by a large current, or the like. Conventionally, a separator shutdown function has been known as one of the techniques for suppressing heat generation of a non-aqueous electrolyte secondary battery. The shutdown function is to block the ion conduction (movement of lithium ions) between the positive and negative electrodes by causing the separator to melt because of abnormal heat generation of a battery and closing pores of the separator, to suppress further heat generation of the battery.

Conventionally, various separators used in non-aqueous electrolyte secondary batteries have been known. For example, Patent Literature 1 discloses a separator for a non-aqueous electrolyte secondary battery in which a layer including inorganic particles of aluminum oxide, boehmite, or the like is formed on the surface of a porous base material. In addition, Patent Literature 2 discloses a separator for a non-aqueous electrolyte secondary battery in which a porous layer including polyvinylidene fluoride as a main component is formed on the surface of a porous base material.

CITATION LIST

Patent Literature

PATENT LITERATURE 1: Japanese Unexamined Patent Application Publication No. 2017-63041
PATENT LITERATURE 2: Japanese Patent Publication No. 4109522

SUMMARY

As described above, it is an important issue to suppress the heat generation of a battery by blocking the ion conduction between the positive and negative electrodes when the battery abnormally generates heat. However, conventional techniques including the techniques of Patent Literatures 1 and 2 may not be able to sufficiently block the ion conduction between the positive and negative electrodes. On the other hand, the separator is required not to inhibit the movement of lithium ions under normal use of the battery and not to increase the internal resistance of the battery. It is an advantage of the present disclosure to provide a non-aqueous electrolyte secondary battery having low internal resistance, excellent output characteristics, and reduced heat generation when an abnormality occurs.

A non-aqueous electrolyte secondary battery which is one aspect of the present disclosure is a non-aqueous electrolyte secondary battery comprising a positive electrode, a negative electrode, and a separator interposed between the positive electrode and the negative electrode, the mixture layer density of the positive electrode being 3.6 g/cc or more, wherein the separator includes a porous base material, a first filler layer including phosphate particles having a BET specific surface area of 5 $m^2/g$ or more and 100 $m^2/g$ or less and polyvinylidene fluoride and formed on a first surface of the base material facing the side of the positive electrode and being in contact with the positive electrode, and a second filler layer including inorganic particles having a melting point higher than that of the phosphate particles and formed at least one of on a second surface of the base material facing the side of the negative electrode and between the base material and the first filler layer. The content of polyvinylidene fluoride included in the first filler layer is 10% by mass or more and 50% by mass or less, and is higher in the region on the positive electrode side than in the region on the base material side.

Advantageous Effect of Invention

According to the non-aqueous electrolyte secondary battery, which is one aspect of the present disclosure, it is possible to sufficiently suppress heat generation when an abnormality occurs while maintaining good output characteristics.

DESCRIPTION OF EMBODIMENTS

As described above, a separator in which a filler layer including inorganic particles is formed on a porous resin base material is known. In general, the porous resin base material has a shutdown function. Therefore, when the battery abnormally generates heat, the shutdown function of the resin base material blocks the ion conduction between the positive and negative electrodes or the like to suppress further heat generation of the battery. However, as the capacity and energy density of the battery increase, the temperature inside the battery becomes very high (for example, 200° C., or more) when an abnormality occurs, and the shape of the separator may not be able to be secured. The filler layer does not have a shutdown function as does a resin base material, and thus if the separator is greatly deformed by heat to such an extent that the shape thereof cannot be secured, even if the filler layer is present, in some cases the ion conduction between the positive and negative electrodes or the like cannot be sufficiently blocked and the heat generation of the battery cannot be sufficiently suppressed.

In view of such situations, as a result of diligent studies by the present inventors, the present inventors have found that by using the above separator having a first filler layer and a second filler layer, the ion conduction between the positive and negative electrodes can be sufficiently blocked when the battery abnormally generates heat. According to the non-aqueous electrolyte secondary battery according to the present disclosure, it is possible to suppress further heat generation of the battery when the battery abnormally generates heat.

In the non-aqueous electrolyte secondary battery according to the present disclosure, when the battery abnormally generates heat because of a short circuit or the like, the phosphate particles included in the first filler layer melt and polycondense with the heat and the potential of the positive electrode as accelerating factors, to form an inert film (polyphosphate film) on the surface of the positive electrode, and the polyphosphate fills pores of the base material. At this time, the shape stability of the separator is secured by the second filler layer, and thus the shutdown effect of the base material is enhanced. Because of this, the movement of lithium ions between the positive and negative electrodes is inhibited, and the exothermic reaction at the time of a short circuit is sufficiently suppressed.

The first filler layer of the separator includes phosphate particles and polyvinylidene fluoride (PVdF), the content of PVdF is 10% by mass or more and 50% by mass or less, and the concentration of PVdF is higher in the region on the positive electrode side than in the region on the base material side. By taking such a form, the first filler layer has good adhesion to the surface of the positive electrode, and by PVdF that has swollen by absorbing the electrolytic solution, the electrolytic solution can be uniformly supplied to the positive electrode having a high mixture layer density of 3.6 g/cc or more with few voids.

Thereby, when the battery abnormally generates heat, the melting and polycondensation reaction of the phosphate particles included in the first filler layer uniformly occur, and the pores of the base material and the second filler layer can be efficiently filled. Thereby, the ion conduction between the positive and negative electrodes can be sufficiently blocked to suppress further heat generation of the battery. By the temperature rise inside the battery due to an internal short circuit of the battery, for example, a flammable or oxidizing gas (oxygen, hydrogen, or the like) is generated from one electrode, and the gas moves to the other electrode and reacts, and this also accelerates the heat generation of the battery. According to the non-aqueous electrolyte secondary battery according to the present disclosure, the movement of the gas can be sufficiently blocked.

In addition, in the non-aqueous electrolyte secondary battery according to the present disclosure, the electrolytic solution can be uniformly supplied to the positive electrode having a high mixture layer density of 3.6 g/cc or more during normal use. Because of this, the charge/discharge reaction on the surface of the positive electrode becomes uniform, the internal resistance of the battery is reduced, and the output characteristics are improved.

Hereinafter, an example of an embodiment of the non-aqueous electrolyte secondary battery according to the present disclosure will be described in detail. In the following, a cylindrical battery in which a wound electrode assembly 14 is housed in a cylindrical battery case will be illustrated, but the electrode assembly is not limited to the wound type, and may be a stacked type in which a plurality of positive electrodes and a plurality of negative electrodes are alternately stacked one by one on each other via a separator. In addition, the battery case is not limited to a cylindrical shape, and may be a metal case such as a rectangular (rectangular battery) or a coin-shaped (coin-shaped battery), a resin case (laminated battery) made of a resin film, or the like.

Figure 1:
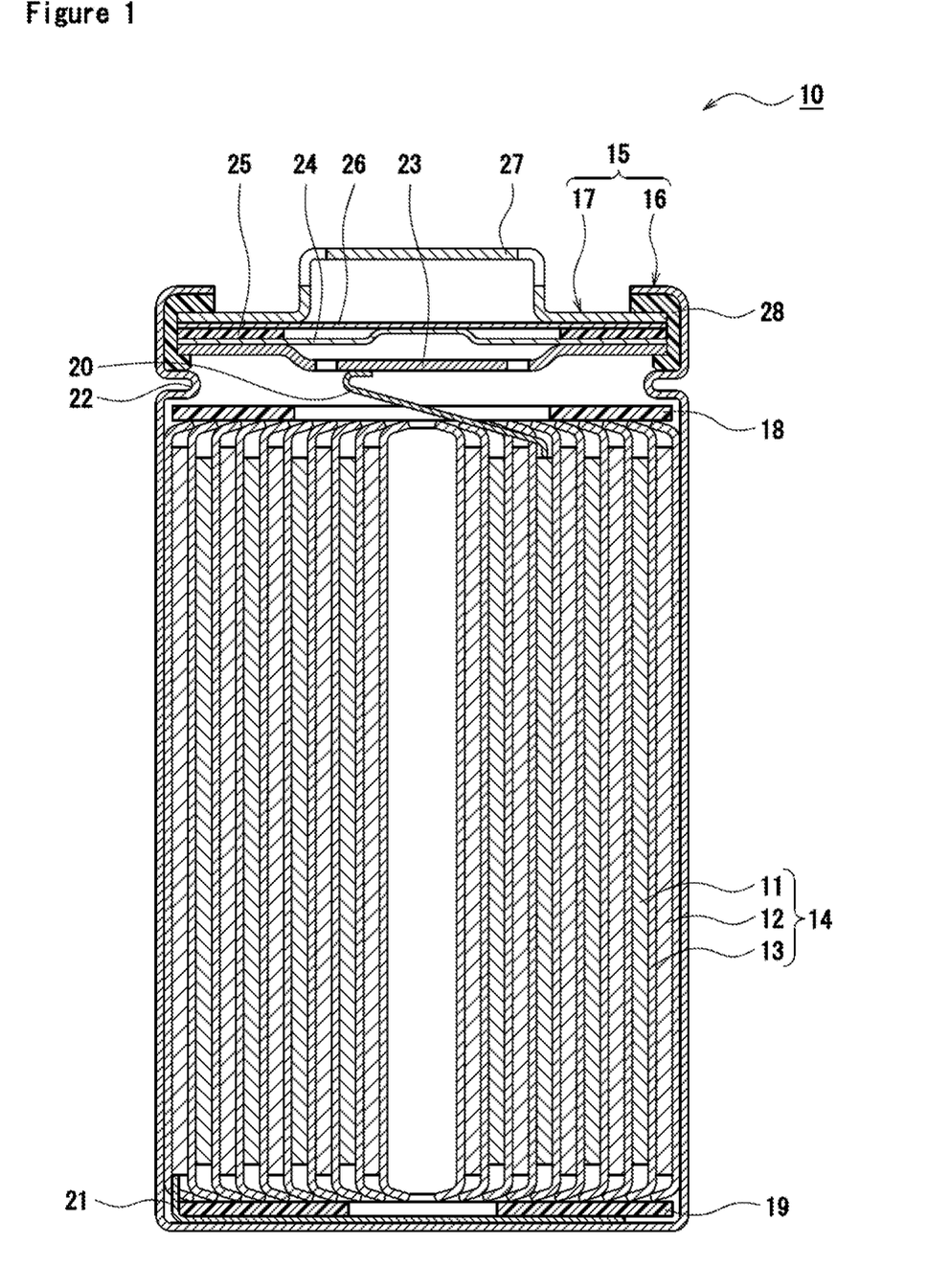
FIG. 1 is a cross-sectional view of a non-aqueous electrolyte secondary battery, which is an example of an embodiment.

FIG. 1 is a cross-sectional view of a non-aqueous electrolyte secondary battery 10, which is an example of an embodiment. As illustrated in FIG. 1, the non-aqueous electrolyte secondary battery 10 comprises an electrode assembly 14, a non-aqueous electrolyte, and a battery case 15 that houses the electrode assembly 14 and the non-aqueous electrolyte. The electrode assembly 14 comprises a positive electrode 11, a negative electrode 12, and a separator 13 interposed between the positive electrode 11 and the negative electrode 12. The electrode assembly 14 has a wound structure in which the positive electrode 11 and the negative electrode 12 are wound via a separator 13. The battery case 15 is composed of a bottomed cylindrical outer can 16 and a sealing assembly 17 that closes the opening of the outer can 16.

The non-aqueous electrolyte includes a non-aqueous solvent and an electrolyte salt dissolved in the non-aqueous solvent. As the non-aqueous solvent, for example, an ester, an ether, a nitrile, an amide, a mixed solvent of two or more thereof, or the like may be used. The non-aqueous solvent may contain a halogen replacement in which at least a part of hydrogen in these solvents is replaced with a halogen atom such as fluorine. The non-aqueous electrolyte is not limited to a liquid electrolyte, and may be a solid electrolyte. As the electrolyte salt, for example, a lithium salt such as $LiPF_6$ is used.

The non-aqueous electrolyte secondary battery 10 comprises insulating plates 18 and 19 disposed above and below the electrode assembly 14, respectively. In the example shown in FIG. 1, a positive electrode lead 20 attached to the positive electrode 11 extends to the sealing assembly 17 side through through-holes of the insulating plate 18, and a negative electrode lead 21 attached to the negative electrode 12 passes through the outside of the insulating plate 19 to extend to the bottom side of the outer can 16. The positive electrode lead 20 is connected to the lower surface of a bottom plate 23, which is the bottom plate of the sealing assembly 17, by welding or the like, and a cap 27, which is the top plate of the sealing assembly 17 electrically connected to the bottom plate 23, serves as a positive electrode terminal. The negative electrode lead 21 is connected to the inner surface of the bottom of the outer can 16 by welding or the like, and the outer can 16 serves as a negative electrode terminal.

The outer can 16 is, for example, a bottomed cylindrical metal container. A gasket 28 is provided between the outer can 16 and the sealing assembly 17 to secure the airtightness inside the battery. The outer can 16 has, for example, a grooved part 22 that supports the sealing assembly 17 with a part of the side surface portion projecting inward. The grooved part 22 is preferably formed in an annular shape in the circumferential direction of the outer can 16, and supports the sealing assembly 17 on the upper surface thereof.

The sealing assembly 17 has a structure in which the bottom plate 23, a lower vent member 24, an insulating member 25, an upper vent member 26, and the cap 27 are stacked in this order from the electrode assembly 14 side. Members constituting the sealing assembly 17 each have, for example, a disk shape or a ring shape, and members except for the insulating member 25 are electrically connected to each other. The lower vent member 24 and the upper vent member 26 are connected to each other at the central portions thereof, and the insulating member 25 is interposed between the peripheral portions thereof. When the internal pressure of the battery rises because of abnormal heat generation, the lower vent member 24 deforms and breaks in such a way as to push up the upper vent member 26 toward the cap 27 side, and the current path between the lower vent member 24 and the upper vent member 26 is blocked. When the internal pressure further rises, the upper vent member 26 breaks and a gas is discharged from the opening of the cap 27.

Figure 2:
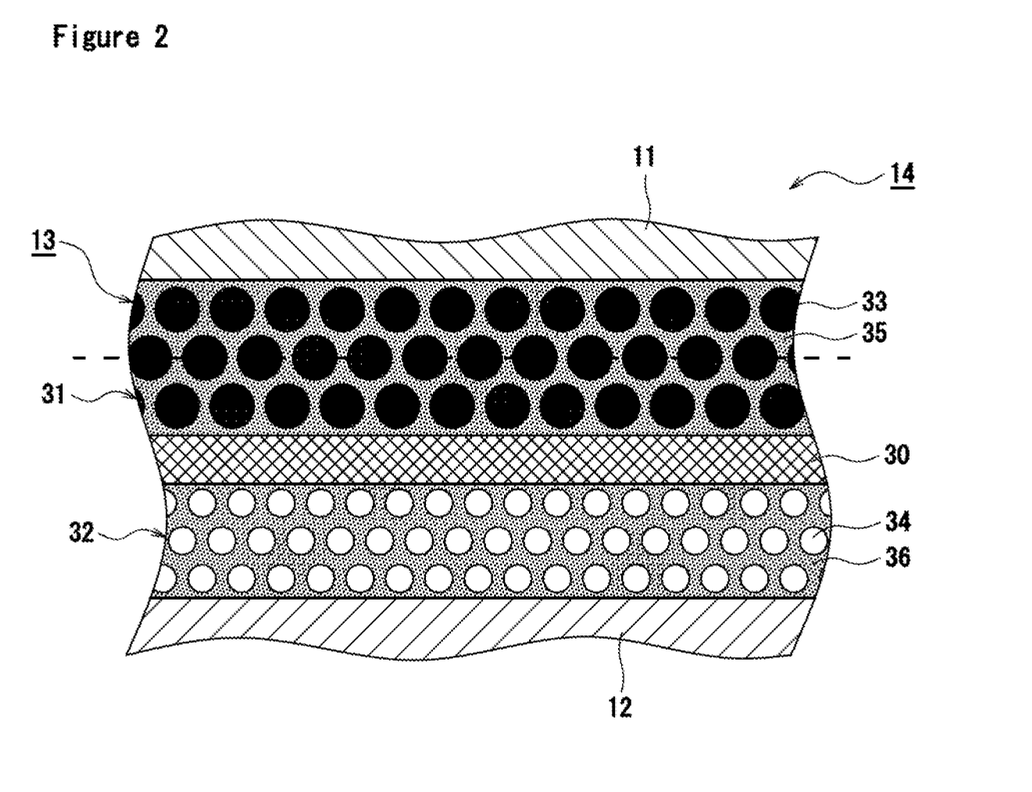
FIG. 2 is a cross-sectional view of an electrode assembly, which is an example of an embodiment.

Hereinafter, the electrode assembly 14 and particularly the separator 13 will be described in detail with reference to FIG. 2. FIG. 2 is a cross-sectional view of the electrode assembly 14, in which a part of the cross section of the separator 13 is enlarged and shown.

[Positive Electrode]

The positive electrode 11 includes a positive electrode current collector and a positive electrode mixture layer formed on the current collector. As the positive electrode current collector, a foil of a metal stable in the potential range of the positive electrode 11 such as aluminum, a film in which the metal is disposed on the surface layer, or the like can be used. The positive electrode mixture layer includes a positive electrode active material, a conductive agent, and a binder, and is preferably formed on both sides of the positive electrode current collector. The positive electrode 11 can be produced by applying a positive electrode mixture slurry including a positive electrode active material, a conductive agent, a binder, and the like onto a positive electrode current collector, drying the coating film, and then rolling it to form a positive electrode mixture layer on both sides of the positive electrode current collector. From the viewpoint of increasing the capacity of the battery, the density of the positive electrode mixture layer is 3.6 g/cc or more, and preferably 3.6 g/cc or more and 4.0 g/cc or less.

The positive electrode active material is composed of a lithium-containing metal composite oxide containing a transition metal element including Ni as a main component. An example of the lithium-containing metal composite oxide is $Li_xN_yM_{1-y}O_2$ (M; at least one of Na, Mg, Sc, Y, Mn, Fe, Co, Ni, Cu, Zn, Al, Cr, Pb, Sb, and B, $0.95 \leq x \leq 1.2$, $0.30 \leq y \leq 0.95$). The Ni content ratio y is $0.30 \leq y \leq 0.95$, preferably $0.50 \leq y \leq 0.95$, and more preferably $0.80 \leq y \leq 0.95$. As the Ni content ratio increases, a higher energy density can be obtained, but the DC resistance increases accordingly, and the battery temperature when the battery abnormally generates heat because of a short circuit or the like also rises. Because of this, the effect of the present disclosure is remarkable in the positive electrode using a composite oxide having a high Ni content ratio.

Examples of the conductive agent included in the positive electrode mixture layer include a carbon material such as carbon black, acetylene black, ketjen black, graphite, a carbon nanotube, a carbon nanofiber, and graphene. Examples of the binder included in the positive electrode mixture layer include a fluorine-containing resin such as polytetrafluoroethylene (PTFE) or polyvinylidene fluoride (PVdF), polyacrylonitrile (PAN), a polyimide, an acrylic resin, and a polyolefin. In addition, these resins may be used in combination with carboxymethyl cellulose (CMC) or a salt thereof, polyethylene oxide (PEO), or the like.

[Negative Electrode]

The negative electrode 12 comprises a negative electrode current collector and a negative electrode mixture layer formed on the current collector. As the negative electrode current collector, a foil of a metal stable in the potential range of the negative electrode 12 such as copper, a film in which the metal is disposed on the surface layer, or the like can be used. The negative electrode mixture layer includes a negative electrode active material and a binder, and is preferably formed on both sides of the negative electrode current collector. The negative electrode 12 can be produced by applying a negative electrode mixture slurry including a negative electrode active material, a binder, and the like onto a negative electrode current collector, drying the coating film, and then rolling it to form a negative electrode mixture layer on both sides of the negative electrode current collector.

The negative electrode active material is not particularly limited as long as the negative electrode active material can reversibly intercalate and deintercalate lithium ions, and for example, a carbon material such as natural graphite or artificial graphite, a metal that is alloyed with Li such as silicon (Si) or tin (Sn), an oxide containing a metal element such as Si or Sn, or the like can be used. In addition, the negative electrode mixture layer may include a lithium titanium composite oxide. The lithium-titanium composite oxide functions as a negative electrode active material. When a lithium titanium composite oxide is used, a conductive agent such as carbon black is preferably added to the negative electrode mixture layer.

As the binder included in the negative electrode mixture layer, a fluorine-containing resin such as PTFE or PVdF, PAN, a polyimide, an acrylic resin, a polyolefin, or the like can be used as in the case of the positive electrode 11. When a negative electrode mixture slurry is prepared using an aqueous solvent, as the binder, CMC or a salt thereof, styrene-butadiene rubber (SBR), polyacrylic acid (PAA) or a salt thereof, polyvinyl alcohol (PVA), or the like can be used.

[Separator]

As illustrated in FIG. 2, the separator 13 has a porous base material 30, a first filler layer 31, and a second filler layer 32. The first filler layer 31 includes phosphate particles 33 having a BET specific surface area of 5 m²/g or more and 100 m²/g or less, and a first binder 35, is formed on the first surface of the base material 30 facing the positive electrode 11 side, and is in contact with the positive electrode 11. The melting and polycondensation of the phosphate particles 33 included in the first filler layer 31 are caused not only by the heat at the time of the occurrence of an abnormality of the battery but also by the potential of the positive electrode 11. Because of this, the first filler layer 31 is preferably in contact with the positive electrode 11. The second filler layer 32 includes inorganic particles 34 having a melting point higher than that of the phosphate particles 33 and is formed on the second surface of the base material 30 facing the negative electrode 12 side.

At least polyvinylidene fluoride (PVdF) is used for the first binder 35. In the present embodiment, the first binder 35 is described as being composed substantially only of PVdF, but a resin other than PVdF may be used in combination as long as the advantage of the present disclosure is not impaired. In addition, the second filler layer 32 includes a second binder 36. As will be described in detail later, the content of PVdF included in the first filler layer 31 is 10% by mass or more and 50% by mass or less. That is, the proportion of the content of PVdF to the total mass of the first filler layer 31 is 10% by mass or more and 50% by mass or less. Further, the PVdF content is higher in the region located on the positive electrode 11 side than in the region located on the base material 30 side of the first filler layer 31. That is, the amount (proportion of the content) of PVdF included in the unit volume of the first filler layer 31 is larger in the region on the positive electrode 11 side than in the region on the base material 30 side.

In the example shown in FIG. 2, the base material 30 is sandwiched between the first filler layer 31 and the second filler layer 32. The separator 13 is disposed between the positive electrode 11 and the negative electrode 12 with the first surface of the base material 30 on which the first filler layer 31 is formed facing the positive electrode 11 side, and the first filler layer 31 is in contact with the surface of the mixture layer of the positive electrode 11. The separator 13 has a three-layer structure in which the first filler layer 31/the base material 30/the second filler layer 32 are stacked in this order from the positive electrode 11 side.

The separator 13 may have another layer other than the first filler layer 31 and the second filler layer 32 as long as the advantage of the present disclosure is not impaired, but the surface of the first filler layer 31 preferably has no other layer that inhibits contact with the positive electrode 11. Here, the surface of the first filler layer 31 means the surface of the first filler layer 31 on the positive electrode 11 side unless otherwise specified. The first filler layer 31 is the outermost surface of the separator 13 on the positive electrode 11 side.

The second filler layer 32 may be formed between the first filler layer 31 and the base material 30, that is, on the first surface of the base material 30. In this case, the first filler layer 31 is formed on the first surface of the base material 30 via the second filler layer 32. In addition, a plurality of first filler layers 31 and a plurality of second filler layers 32 may be provided. For example, each filler layer may be formed on the first surface and the second surface of the base material 30. However, in any form, each layer is formed such that the first filler layer 31 is the outermost surface layer on the positive electrode 11 side of the separator 13.

The base material 30 is composed of a porous sheet having ion permeability and insulating properties, such as a microporous thin film, a woven fabric, and a non-woven fabric. Examples of the resin constituting the base material 30 include a polyolefin such as polyethylene, polypropylene, or a copolymer of polyethylene and α-olefin, acrylic resin, polystyrene, polyester, and cellulose. The base material 30 may be composed of, for example, a polyolefin as a main component, and may be composed substantially only of a polyolefin. The base material 30 may have a single-layer structure or a stacked structure. The thickness of the base material 30 is not particularly limited, and is preferably, for example, 3 μm or more and 20 μm or less.

The porosity of the base material 30 is preferably, for example, 30% or more and 70% or less in terms of securing ion conductivity during charging and discharging of the battery. The porosity of the base material 30 is measured by the following method.

(1) Ten points of the base material 30 are punched into a circle having a diameter of 2 cm, and the thickness h and the mass w of the central portion of each punched small piece of the base material 30 are each measured.
(2) From the thickness h and the mass w, the volume V and the mass W of the 10 small pieces are determined, and the porosity ε is calculated from the following expression.

Porosity $\varepsilon(\%)=((\rho V-W)/(\rho V))\times 100$

ρ: Density of a material constituting the base material

The average pore size of the base material 30 is, for example, 0.02 μm or more and 5 μm or less, and preferably 0.05 μm or more and 1 μm or less. The average pore size of the base material 30 is measured using a palm porometer (manufactured by Seika Corporation) that can measure the pore size by the bubble point method (JIS K3832, ASTM F316-86).

The first filler layer 31 is a porous layer including the phosphate particles 33, in which pores through which lithium ions pass are formed in gaps between the phosphate particles 33. The phosphate particles 33 melt and polycondense with the heat and the potential of the positive electrode 11 as accelerating factors when, for example, a charged battery abnormally generates heat, thereby an inactive polyphosphate film is formed on the surface of the positive electrode 11, and also the polyphosphate fills pores of the base material 30, thereby blocking the ion conduction between the positive and negative electrodes, to suppress further heat generation. The pores are closed by melting of the base material 30 itself as well.

The porosity of the first filler layer 31 is preferably 30% or more and 70% or less from the viewpoint of securing good ion conductivity, physical strength, and the like during charging and discharging of the battery. The porosity of the first filler layer 31 is calculated by the following expression (the same also applies to the second filler layer 32).

Porosity (%) of the first filler layer=$100-[[W/(d\times\rho)]\times 100]$

W: Basis weight of the first filler layer (g/cm$^2$)
d: Thickness of the first filler layer (cm)
ρ: Average density of the first filler layer (g/cm$^3$)

Examples of the phosphate particles 33 include $Li_3PO_4$, LiPON, $Li_2HPO_4$, $LiH_2PO_4$, $Na_3PO_4$, $Na_2HPO_4$, $NaH_2PO_4$, $Zr_3(PO_4)_4$, $Zr(HPO_4)_2$, $HZr_2(PO_4)_3$, $K_3PO_4$, $K_2HPO_4$, $KH_2PO_4$, $Ca_3(PO_4)_2$, $CaHPO_4$, $Mg_3(PO_4)_2$, and $MgHPO_4$. Among these, at least one selected from lithium phosphate ($Li_3PO_4$), dilithium hydrogen phosphate ($Li_2HPO_4$), and lithium dihydrogen phosphate ($LiH_2PO_4$) is preferable from the viewpoint of suppressing a side reaction and the like.

In general, the phosphate particles 33 preferably melt at a temperature of about 140° C. to 190° C. in consideration of the temperature applied when the battery is manufactured, the temperature inside the battery when the battery is normally used, and the temperature inside the battery when the battery is in an abnormal state.

The BET specific surface area of the phosphate particles 33 is preferably 5 m$^2$/g or more and 100 m/g or less, and more preferably 20 m$^2$/g or more and 100 m/g or less. The BET specific surface area is measured according to the BET method (nitrogen adsorption method) of JIS R1626. Phosphate particles 33 having a BET specific surface area in the above range easily melt at a temperature of about 140° C. to 190° C., and thus, by using the particles, the phosphate that has melted and polycondensed at the time of abnormal heat generation of the battery can quickly cover the surface of the positive electrode 11 and quickly close pores of the base material 30.

The median diameter (50% particle size $D_{50}$) of the phosphate particles 33 is, for example, 0.05 μm or more and 2 μm or less. When the median diameter of the phosphate particles 33 does not satisfy the above range, the amount of heat generated at the time of the occurrence of an abnormality of the battery may become larger than when the above range is satisfied. Here, the median diameter means the particle size at which the volume integrated value is 50% in the particle size distribution measured by the laser diffraction method. The median diameter is measured using a laser diffraction/scattering type particle size distribution measuring instrument (manufactured by HORIBA, Ltd.).

A preferable median diameter of the phosphate particles 33 is 0.05 μm or more and 1 μm or less, and is smaller than the average pore size of the base material 30. By using the phosphate particles 33 having a median diameter smaller than the average pore size of the base material 30, some of the phosphate particles 33 enter pores of the base material 30, and easily close the pores of the base material 30 when a short circuit occurs. The depth to which the phosphate particles 33 enter pores of the base material 30 is preferably 0.1 μm or more and 1 μm or less in the thickness direction of the base material 30.

The content of the phosphate particles 33 is preferably an amount sufficient to close pores of the base material 30, and is at least 50% by mass, and preferably 50% by mass or more and 90% by mass or less based on the total mass of the first filler layer 31. The first filler layer 31 is composed substantially only of the phosphate particles 33 and the first binder 35. A preferable first binder 35 is PVdF as described above. The content of PVdF is 10% by mass or more and 50% by mass or less based on the total mass of the first filler layer 31. The content of PVdF is higher in the region on the positive electrode 11 side (hereinafter, sometimes referred to as the "second region") than in the region on the base material 30 side (hereinafter, sometimes referred to as the "first region") of the first filler layer 31.

The content (concentration) per unit volume of PVdF included in the first filler layer 31 is highest, for example, on the surface of the first filler layer 31 in contact with the positive electrode 11. In the thickness direction of the first filler layer 31, the content of PVdF may gradually increase from the base material 30 side toward the positive electrode 11 side (the surface of the first filler layer 31). Alternatively, the content of PVdF may steeply increase in the vicinity of the surface of the first filler layer 31. In either form, PVdF is unevenly distributed in the second region of the first filler layer 31. That is, the proportion of the mass of PVdF to the mass of the phosphate particles 33 is higher in the second region than in the first region.

In this case, PVdF that has absorbed and swollen the electrolytic solution causes the first filler layer 31 to adhere strongly to the surface of the positive electrode 11, making the charge/discharge reaction uniform. Thereby, when the battery abnormally generates heat, the melting and polycondensation reaction of the phosphate particles included in the first filler layer 31 uniformly occur, and the pores of the base material 30 and the second filler layer 32 can be efficiently filled. Then, the ion conduction between the positive and negative electrodes is quickly blocked to suppress further heat generation. In addition, the charge/discharge reaction on the surface of the positive electrode becomes uniform, thereby the internal resistance of the battery is reduced, and the output characteristics are improved.

When the first filler layer 31 is divided in half at the center in the thickness direction, the content of PVdF present in the second region on the positive electrode 11 side (assuming that the surface on the base material 30 side is 0% and the surface on the positive electrode 11 side is 100%, the region of 50%-100% on the positive electrode side of the first filler layer 31) is, for example, more than 50% by mass and 80% by mass or less of the total mass of PVdF included in the entire first filler layer 31. The content of PVdF is preferably 55% by mass or more and 75% by mass or less, and more preferably 60% by mass or more and 70% by mass or less. In other words, the content of PVdF present in the first region on the base material 30 side (the region of 50%-100% on the surface side of the first filler layer 31) is, for example, 20% by mass or more and less than 50% by mass of the total mass of PVdF included in the entire first filler layer 31.

PVdF may be included in a large amount in the vicinity of the surface of the second region of the first filler layer 31, particularly in the region of 80%-100% on the positive electrode side or the region of 90%-100%. PVdF present in the region of 80%-100% on the positive electrode side may account for, for example, more than 50% by mass and 80% by mass or less of the total mass of PVdF included in the entire first filler layer 31. PVdF may be distributed substantially uniformly in the second region, but the content of PVdF is preferably higher on the positive electrode 11 side than on the first region side of the second region.

The thickness of the first filler layer 31 is not particularly limited, and is preferably 1 μm or more and 10 μm or less, more preferably 1 μm or more and 5 μm or less, and particularly preferably 2 μm or more and 4 μm or less. From the viewpoint of suppressing the amount of heat generated in the battery, the thickness of the first filler layer 31 is preferably 2 times or more and 40 times or less and more preferably 3 times or more and 20 times or less the median diameter of the phosphate particles 33.

The first filler layer 31 may further include a heteropolyacid. It is considered that the addition of a heteropolyacid promotes polycondensation of the molten phosphate. Examples of the heteropolyacid include phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, and silicomolybdotungstovanadic acid.

The first filler layer 31 can be formed by applying a slurry-like composition including the phosphate particles 33, PVdF, and a dispersion medium(a solvent that dissolves PVdF) (a first slurry) onto the surface of the base material 30 and drying the coating film. The concentration distribution of PVdF in the thickness direction of the first filler layer 31 can be adjusted, for example, by controlling the migration of PVdF in the drying process of the coating film. Specifically, the type of the dispersion medium, the drying temperature and the drying time of the coating film, and the like are important control factors. As the dispersion medium. N-methyl-2-pyrrolidone (NMP), methyl ethyl ketone (MEK), and the like can be used. As the first slurry, a highly volatile solvent such as ME K is preferably used. By quickly drying the coating film using a highly volatile solvent, PVdF can easily move to the surface side of the first filler layer 31, and the content (concentration) of PVdF can be increased on the surface side.

The concentration distribution of PVdF can also be realized by using two slurries having different amounts of PVdF added. For example, after a slurry having a small amount of PVdF added is applied to the surface of the base material 30 to form a fast layer of the first filler layer 31, a slurry having a large amount of PVdF added may be applied onto the first layer to form a second layer of the first filler layer 31. In general, the interface between the first layer and the second layer cannot be confirmed, and thus the first filler layer 31 having a substantially single-layer structure can be obtained in this case as well.

The second filler layer 32 is a porous layer including the inorganic particles 34 having a high melting point (heat resistance), in which pores through which lithium ions pass are formed in gaps between the inorganic particles 34. The porosity of the second filler layer 32 is preferably 30% or more and 70% or less, as in the case of the first filler layer 31. The second filler layer 32 has the function of suppressing the base material 30 from being greatly deformed by abnormal heat generation of the battery and improving the shape stability of the separator 13. By providing the second filler layer 32 which is a heat-resistant layer, the shutdown effect of the base material 30 is improved, and the exothermic reaction at the time of a short circuit is sufficiently suppressed.

The inorganic particles 34 may be particles having a higher melting point, thermal decomposition temperature, and the like than the phosphate particles 33 included in the first filler layer 31, and may be composed of an insulating inorganic compound that does not melt or decompose when the battery abnormally generates heat. An example of the inorganic particles 34 is particles of a metal oxide, a metal oxide hydrate, a metal hydroxide, a metal nitride, a metal carbide, a metal sulfide, or the like. The median diameter of the inorganic particles 34 is, for example, 0.2 µm or more and 2 µm or less, and is larger than the median diameter of the phosphate particles 33. When the median diameter of the inorganic particles 34 does not satisfy the above range, the amount of heat generated at the time of abnormal heat generation may become larger than when the above range is satisfied.

Examples of the metal oxide and the metal oxide hydrate include aluminum oxide (alumina), boehmite ($Al_2O_3 \cdot H_2O$ or AlOOH), magnesium oxide, titanium oxide, zirconium oxide, silicon oxide, yttrium oxide, and zinc oxide. Examples of the metal nitride include silicon nitride, aluminum nitride, boron nitride, and titanium nitride. Examples of the metal carbide include silicon carbide and boron carbide. Examples of the metal sulfide include barium sulfate. Examples of the metal hydroxide include aluminum hydroxide. The melting point of a substance such as boehmite, which melts after being modified to alumina, may be higher than the melting point of the phosphate particles 33.

In addition, the inorganic particles 34 may be particles of a porous aluminosilicate such as zeolite ($M_{2/n}O \cdot Al_2O_3 \cdot xSiO_2 \cdot yH_2O$, M is a metal element, $x \geq 2$, $y \geq 0$), a layered silicate such as talc ($Mg_3Si_4O_{10}(OH)_2$), barium titanate ($BaTiO_3$), strontium titanate ($SrTiO_3$), or the like. Among these, at least one selected from aluminum oxide, boehmite, talc, titanium oxide, and magnesium oxide is preferable from the viewpoint of insulation and heat resistance.

The second binder 36 included in the second filler layer 32 is not particularly limited, and may be the same resin (PVdF) as the first binder 35, or may be a different resin such as poly N-vinylacetamide. The content of the inorganic particles 34 is preferably 90% by mass or more, and more preferably 92% by mass or more and 98% by mass or less, based on the total mass of the second filler layer 32. The content of the binder in the second filler layer 32 is, for example, 2% by mass or more and 8% by mass or less. The thickness of the second filler layer 32 is not particularly limited, and is preferably 1 µm or more and 5 µm or less, and particularly preferably 2 µm or more and 4 µm or less.

The second filler layer 32 can be formed by applying a slurry-like composition including the inorganic particles 34, the second binder 36, and a dispersion medium (a solvent that dissolves the second binder 36) (a second slurry) to the surface of the base material 30 and drying the coating film, as in the case of the first filler layer 31. As the dispersion medium, for example, NWP is used.

EXAMPLES

Hereinafter, the present disclosure will be further described with reference to Examples, but the present disclosure is not limited to these Examples.

Example 1

[Production of Separator]

A separator having a three-layer structure of a first filler layer including phosphate particles/a porous base material made of polyethylene/a second filler layer including boehmite particles was produced according to the following procedure.

(1) Preparation of First Slurry

Lithium phosphate particles ($Li_3PO_4$) having a BET specific surface area of 54.07 $m^2/g$ and a $D_{50}$ of 0.93 µm and PVdF were mixed at a mass ratio of 70:30, and methyl ethyl ketone (MEK) was added to prepare a first slurry having a solid concentration of 15% by mass.

(2) Preparation of Second Slurry

Boehmite particles and poly N-vinylacetamide were mixed at a mass ratio of 100:6.5, and N-methyl-2-pyrrolidone (NMP) was added to prepare a second slurry-like composition having a solid concentration of 15% by mass.

(3) Formation of First Filler Layer

The first slurry was applied to one surface of a single-layer polyethylene porous base material having a thickness of 12 µm by a gravure coating method such that the layer thickness after drying was 2 µm, and the coating film was dried at 60° C. for 2 minutes to form a first filler layer.

(4) Formation of Second Filler Layer

The second slurry was applied to the other surface of the porous base material by a gravure coating method such that the layer thickness after drying was 2 µm, and the coating film was dried at 60° C. for 2 minutes to form a second filler layer.

[Observation of Distribution of PVdF in the First Filler Layer]

A cross section of the coating film of the first filler layer was produced using a cross-section polisher, the entire coating film was impregnated with a 2% by weight $OsO_4$ aqueous solution, and the resulting mixture was left for 2 hours to modify PVdF of the first filler layer with Os. By observing the distribution of Os in the layer cross section by energy dispersive X-ray analysis (EDX), the distribution of PVdF in the thickness direction of the first filler layer was observed. Measurement results of the PVdF content are shown in Table 1.

[Production of Positive Electrode]

As the positive electrode active material, lithium composite oxide particles represented by $Li_{1.05}Ni_{0.82}Co_{0.15}Al_{0.03}O_2$ were used. The positive electrode active material, carbon black, and PVdF were mixed at a mass ratio of 100:1:1 in NMP to prepare a positive electrode mixture slurry. Next, the positive electrode mixture slurry was applied to both sides of a positive electrode current collector made of aluminum foil, the coating film was dried, then it was rolled using a rolling roller, and further an aluminum current collector tab was attached to produce a positive electrode having positive electrode mixture layers formed on both sides of the positive electrode current collector. The filling density of the positive electrode mixture was 3.70 $g/cm^3$.

[Production of Negative Electrode]

Artificial graphite, sodium carboxymethyl cellulose (CMC-Na), and a dispersion of styrene-butadiene rubber (SBR) were mixed in water at a solid mass ratio of 98:1:1 to prepare a negative electrode mixture slurry. Next, the negative electrode mixture slurry was applied to both sides of a negative electrode current collector made of copper foil, the coating film was dried, then it was rolled using a rolling roller, and further a nickel current collector tab was attached to produce a negative electrode having negative electrode mixture layers formed on both sides of the negative electrode current collector. The filling density of the negative electrode mixture was 1.70 $g/cm^3$.

[Preparation of Non-Aqueous Electrolyte]

In a mixed solvent in which ethylene carbonate (EC), ethyl methyl carbonate (EMC), and dimethyl carbonate (DMC) were mixed at a volume ratio of 3:3:4, lithium hexafluorophosphate ($LiPF_6$) was dissolved in such a way as to reach a concentration of 1 mol/liter. Further, vinylene carbonate (VC) was dissolved in the above mixed solvent at a concentration of 1% by mass to prepare a non-aqueous electrolyte.

[Production of Non-Aqueous Electrolyte Secondary Battery]

The positive electrode and the negative electrode were wound via the separator and then heat-pressed at 80° C. to produce a flat wound electrode assembly. At this time, the separator was disposed with the surface on which the first filler layer was formed facing the positive electrode such that the first filler layer was in contact with the surface of the positive electrode. The electrode assembly was housed in a battery outer body made of an aluminum laminate sheet, the above non-aqueous electrolyte was injected, and then the outer body was sealed to produce a 750-mAh non-aqueous electrolyte secondary battery.

The performance (output characteristics and heat generation suppression) of the above non-aqueous electrolyte secondary battery was evaluated by the following method. Evaluation results are shown in Table 1.

[Measurement of Direct Current Resistance]

The non-aqueous electrolyte secondary battery was charged in an environment of 25° C. at a constant current of 150 mA until the battery voltage reached 4.2 V, and then charged at a constant voltage of 4.2 V until the current value reached 37.5 mA. After that, the discharge capacity after discharging at 150 mA until the battery voltage reached 2.5 V was measured. The battery was charged again under the above charging conditions, discharged at 150 mA until 50% of the discharge capacity (discharge depth) was reached, and then discharged at current values of 150 mA, 375 mA, and 750 mA each for 10 seconds, and the voltage values when 10 seconds passed were measured. The direct current resistance value $R_{DC}$ when the change in the current value was $\Delta I$ and the change in the voltage value was $\Delta V$ was calculated from the following expression.

$$R_{DC} = \Delta V / \Delta I$$

[Nail Piercing Test]

The non-aqueous electrolyte secondary battery was charged in an environment of 25° C. at a constant current of 150 mA until the battery voltage reached 4.2 V, and then charged at a constant voltage of 4.2 V until the current value reached 37.5 mA. In an environment of 25° C., the tip of a round nail having a size of 3 mmφ was caused to vertically pierce into the center of the side surface of the charged battery at a speed of 10 mm/sec, and when the round nail completely penetrated the battery, the piercing of the round nail was stopped. The maximum achieved temperature at a location 5 mm away from the location where the nail was caused to pierce on the side surface of the battery was measured.

Example 2

A non-aqueous electrolyte secondary battery was produced and the performance thereof was evaluated in the same manner as in Example 1 except that in the production of the positive electrode, the coating film was rolled such that the filling density of the positive electrode mixture was 3.60 g/cm³.

Example 3

A non-aqueous electrolyte secondary battery was produced and the performance thereof was evaluated in the same manner as in Example 1 except that in the production of the separator, lithium phosphate particles ($Li_3PO_4$) having a BET specific surface area of 54.07 m²/g and a $D_{50}$ of 0.93 μm and PVdF were mixed at a mass ratio of 50:50, and MEK was added to prepare a first slurry having a solid concentration of 15% by mass.

Example 4

A non-aqueous electrolyte secondary battery was produced and the performance thereof was evaluated in the same manner as in Example 1 except that in the production of the separator, lithium phosphate particles ($Li_3PO_4$) having a BET specific surface area of 54.07 m²/g and a $D_{50}$ of 0.93 μm and PVdF were mixed at a mass ratio of 90:10, and MEK was added to prepare a first slurry having a solid concentration of 15% by mass.

Example 5

A non-aqueous electrolyte secondary battery was produced and the performance thereof was evaluated in the same manner as in Example 1 except that in the production of the separator, dilithium hydrogen phosphate particles ($Li_2HPO_4$) having a BET specific surface area of 7.1 m²/g and a $D_{50}$ of 0.33 μm and PVdF were mixed at a mass ratio of 70:30, and MEK was added to prepare a first slurry having a solid concentration of 15% by mass.

Comparative Example 1

A non-aqueous electrolyte secondary battery was produced and the performance thereof was evaluated in the same manner as in Example 1 except that in the production of the separator, lithium phosphate particles ($Li_3PO_4$) having a BET specific surface area of 3.65 m²/g and a $D_{50}$ of 1.60 μm and PVdF were mixed at a mass ratio of 70:30, and MEK was added to prepare a first slurry having a solid concentration of 15% by mass.

Comparative Example 2

A non-aqueous electrolyte secondary battery was produced and the performance thereof was evaluated in the same manner as in Example 1 except that in the production of the separator, dilithium hydrogen phosphate particles ($Li_2HPO_4$) having a BET specific surface area of 1.56 m²/g and a $D_{50}$ of 0.87 μm and PVdF were mixed at a mass ratio of 70:30, and MEK was added to prepare a first slurry having a solid concentration of 15% by mass.

Comparative Example 3

A non-aqueous electrolyte secondary battery was produced and the performance thereof was evaluated in the same manner as in Example 1 except that in the production of the separator, lithium phosphate particles ($Li_3PO_4$) having a BET specific surface area of 54.07 m²/g and a $D_{50}$ of 0.93 μm and PVdF were mixed at a mass ratio of 95:5, and MEK was added to prepare a first shiny having a solid concentration of 15% by mass.

Comparative Example 4

A non-aqueous electrolyte secondary battery was produced and the performance thereof was evaluated in the same manner as in Example 1 except that in the production of the separator, lithium phosphate particles ($Li_3PO_4$) having a BET specific surface area of 54.07 m²/g and a $D_{50}$ of 0.93 µm and PVdF were mixed at a mass ratio of 40:60, and MEK was added to prepare a first slurry having a solid concentration of 15% by mass.

Comparative Example 5

A non-aqueous electrolyte secondary battery was produced and the performance thereof was evaluated in the same manner as in Example 1 except that in the preparation of the first slurry in the preparation of the separator, NMP was used instead of MEK and in the production of the first filler layer, the coating film was dried at 60° C. for 5 minutes to form a first filler layer.

Comparative Example 6

A non-aqueous electrolyte secondary battery was produced and the performance thereof was evaluated in the same manner as in Example 1 except that in the production of the separator, only a first filler layer was formed on one surface of a single-layer polyethylene porous base material having a thickness of 12 µm.

Comparative Example 7

A non-aqueous electrolyte secondary battery was produced and the performance thereof was evaluated in the same manner as in Example 1 except that in the production of the separator, only a second filler layer was formed on one surface of a single-layer polyethylene porous base material having a thickness of 12 µm.

Comparative Example 8

In the production of the separator, lithium phosphate particles ($Li_3PO_4$, BET specific surface area: 54.07 m²/g, $D_{50}$: 0.93 µm), boehmite particles, and poly N-vinylacetamide were mixed at a mass ratio of 50:50:6.5, and MEK was added to prepare a slurry having a solid concentration of 15.0% by mass. The slurry was applied to one surface of a polypropylene porous sheet having a thickness of 12 µm by a gravure coating method such that the layer thickness after drying was 2 µm, and the coating film was dried to form a first filler layer composed of a mixed layer of the lithium phosphate particles and the boehmite particles. No second filler layer was formed. A non-aqueous electrolyte secondary battery was produced, and the performance thereof was evaluated under the same conditions as in Example 1 for the other conditions.

Comparative Example 9

A non-aqueous electrolyte secondary battery was produced and the performance thereof was evaluated in the same manner as in Example 1 except that in the production of the separator, a separator having a two-layer structure of a polyethylene porous base material/a second filler layer including boehmite particles was produced, and in the production of the positive electrode, the first slurry used in the production of the separator was applied to the surface of the positive electrode by a gravure coating method such that the layer thickness after drying was 2 µm, and the coating film was dried at 60° C. for 2 minutes to form a third filler layer.

TABLE 1

| | First Filler Layer (Positive Electrode Side Filler Layer) | | | | | Second Filler Layer | | Battery Performance Evaluation | |
|---|---|---|---|---|---|---|---|---|---|
| | | Phosphate | | PVdF Content | | | Positive Electrode | | |
| | Composition | Specific Surface Area (m²/g) | Total (% by mass) | Second Region*¹ (% by mass) | Disposition | Inorganic Particle Material | Positive Electrode Mixture Density (g/cc) | Direct Current Resistance Value (mΩ) | Maximum Temperature (° C.) |
| Example 1 | $Li_3PO_4$ | 54.07 | 30 | 62 | On PE Base Material | Boehmite | 3.7 | 152 | 441 |
| Example 2 | $Li_3PO_4$ | 54.07 | 30 | 61 | On PE Base Material | Boehmite | 3.6 | 143 | 460 |
| Example 3 | $Li_3PO_4$ | 54.07 | 50 | 67 | On PE Base Material | Boehmite | 3.7 | 157 | 463 |
| Example 4 | $Li_3PO_4$ | 54.07 | 10 | 63 | On PE Base Material | Boehmite | 3.7 | 146 | 435 |
| Example 5 | $Li_2HPO_4$ | 7.1 | 30 | 65 | On PE Base Material | Boehmite | 3.7 | 150 | 469 |
| Comparative Example 1 | $Li_3PO_4$ | 3.65 | 30 | 64 | On PE Base Material | Boehmite | 3.7 | 154 | 513 |
| Comparative Example 2 | $Li_2HPO_4$ | 1.56 | 30 | 61 | On PE Base Material | Boehmite | 3.7 | 156 | 518 |
| Comparative Example 3 | $Li_3PO_4$ | 54.07 | 5 | 65 | On PE Base Material | Boehmite | 3.7 | 145 | 484 |
| Comparative Example 4 | $Li_3PO_4$ | 54.07 | 60 | 70 | On PE Base Material | Boehmite | 3.7 | 159 | 492 |
| Comparative Example 5 | $Li_3PO_4$ | 54.07 | 30 | 50 | On PE Base Material | Boehmite | 3.7 | 178 | 449 |
| Comparative Example 6 | $Li_3PO_4$ | 54.07 | 30 | 65 | On PE Base Material | — | 3.7 | 144 | 526 |
| Comparative Example 7 | — | — | — | — | On PE Base Material | Boehmite | 3.7 | 147 | 525 |
| Comparative Example 8 | Mixed | 54.07 | 30 | 60 | On PE Base Material | — | 3.7 | 145 | 508 |
| Comparative Example 9 | $Li_3PO_4$ | 54.07 | 30 | 35 | On Positive Electrode*² | Boehmite | 3.7 | 185 | 457 |

*¹ The mass of PVdF present in the second region of the first filler layer based on the total mass of PVdF included in the entire first filler layer
*² Formed as third filler layer As can be understood from the evaluation results shown in Table 1, all the batteries of the Examples have a low direct current resistance value and a low maximum achieved temperature in the nail piercing test. That is, according to the batteries of the Examples, both good output characteristics and the effect of suppressing heat generation when an abnormality occurs can be achieved at the same time. On the other hand, in the batteries of the Comparative Examples, either one of the direct current resistance value and the maximum achieved temperature is high, and good output characteristics and the effect of suppressing heat generation when an abnormality occurs cannot be achieved at the same time.

In Examples 1 to 5 and Comparative Examples 1 to 4, the PVdF concentration in the thickness direction of the first filler layer was higher on the surface side than on the porous base material side, whereas in Comparative Example 5, the PVdF concentration was comparable across the entire first filler layer. It is considered that the reason why the direct current resistance of the battery of Comparative Example 5 is high is that when PVdF is not unevenly distributed on the surface of the first filler layer, PVdF permeates into the pores of the porous base material and the adhesion between the positive electrode and the first filler layer is reduced. In this case, the PVdF that has absorbed and swollen the electrolytic solution makes it impossible to uniformly supply the electrolytic solution to the positive electrode, and the charge/discharge reaction on the surface of the positive electrode becomes non-uniform, and thus the resistance increases.

The heat generation suppression in the nail piercing test can be obtained when the specific surface area of the phosphate in the first filler layer is 5 g/m$^2$ or more. It is considered that this is because a sufficient reaction area can be obtained for the effect of suppressing heat generation due to the polycondensation reaction of the phosphate. The effect of suppressing heat generation can be obtained when the PVdF content is 10% by mass or more and 50% by mass or less. It is considered that this is because if the PVdF content is less than 10% by mass, sufficient adhesion between the positive electrode and the first filler layer is not secured, and if the PVdF content is more than 50% by mass, the phosphate required for suppressing heat generation is insufficient.

In addition, when the first filler layer or the second filler layer is not present, or when a mixed layer of phosphate and boehmite is provided instead of the first and second filler layers (Comparative Examples 6 to 8), heat generation cannot be sufficiently suppressed in the nail piercing test.

It is considered that when the first filler layer is not formed on the separator and the third filler layer including phosphate particles and PVdF is formed on the positive electrode surface (Comparative Example 9), the PVdF content on the positive electrode side of the third filler layer (the second region side in Example 1) was lowered and PVdF permeated into pores of the porous base material, or the adhesion between the positive electrode and the first filler layer was lowered and the direct current resistance was increased.

REFERENCE SIGNS LIST

10 non-aqueous electrolyte secondary battery, 11 positive electrode, 12 negative electrode, 13 separator, 14 electrode assembly, 15 battery case, 16 outer can, 17 sealing assembly, 18, 19 insulating plate, 20 positive electrode lead, 21 negative electrode lead, 22 grooved part, 23 bottom plate, 24 lower vent member, 25 insulating member, 26 upper vent member, 27 cap, 28 gasket, 30 base material, 31 first filler layer, 32 second filler layer, 33 phosphate particle, 34 inorganic particle, 35 first binder, 36 second binder

The invention claimed is:

1. A non-aqueous electrolyte secondary battery comprising:
    a positive electrode;
    a negative electrode; and
    a separator interposed between the positive electrode and the negative electrode,
    a mixture layer density of the positive electrode being 3.6 g/cc or more, wherein
    the separator includes:
    a porous base material;
    a first filler layer including phosphate particles having a BET specific surface area of 5 m$^2$/g or more and 100 m$^2$/g or less and polyvinylidene fluoride and formed on a first surface of the base material facing a side of the positive electrode and being in contact with the positive electrode; and
    a second filler layer including inorganic particles having a melting point higher than that of the phosphate particles and formed at least one of on a second surface of the base material facing a side of the negative electrode and between the base material and the first filler layer, wherein
    a content of polyvinylidene fluoride included in the first filler layer is 10% by mass or more and 50% by mass or less, and is higher in a region on the positive electrode side than in a region on the base material side,
    in the first filler layer, a content of the phosphate particles is at least 50% by mass based on a total mass of the first filler layer, and
    in the second filler layer, a content of the inorganic particles having a melting point higher than that of the phosphate particles is 90% by mass or more based on a total mass of the second filler layer.

2. The non-aqueous electrolyte secondary battery according to claim 1, wherein when the first filler layer is divided in half at a center in a thickness direction, a content of polyvinylidene fluoride present in the region located on the positive electrode side is more than 50% by mass and 80% by mass or less of a total mass of polyvinylidene fluoride included in the entire first filler layer.

3. The non-aqueous electrolyte secondary battery according to claim 1, wherein the base material includes a polyolefin as a main component.

4. The non-aqueous electrolyte secondary battery according to claim 1, wherein the second filler layer is formed on the second surface of the base material.

5. The non-aqueous electrolyte secondary battery according to claim 1, wherein the phosphate particles are at least one selected from lithium phosphate, dilithium hydrogen phosphate, and lithium dihydrogen phosphate.

6. The non-aqueous electrolyte secondary battery according to claim 1, wherein the second filler layer is formed between the base material and the first filler layer.

7. The non-aqueous electrolyte secondary battery according to claim 1, wherein the phosphate particles include at least one selected from the group consisting of LiPON, Li$_2$HPO$_4$, LiH$_2$PO$_4$, Na$_3$PO$_4$, Na$_2$HPO$_4$, NaH$_2$PO$_4$, Zr$_3$(PO$_4$)$_4$, Zr(HPO$_4$)$_2$, HZr$_2$(PO$_4$)$_3$, K$_3$PO$_4$, K$_2$HPO$_4$, KH$_2$PO$_4$, Ca$_3$(PO$_4$)$_2$, CaHPO$_4$, Mg$_3$(PO$_4$)$_2$, MgHPO$_4$, and combinations thereof.

8. The non-aqueous electrolyte secondary battery according to claim 1, wherein the BET specific surface area of the phosphate particles is from 7.1 $m^2/g$ to 54.07 $m^2/g$.

\* \* \* \* \*